Feb. 17, 1948.　　　G. HANIQUET　　　2,436,107
POSITIVE FEED FOOD CHOPPER
Filed July 21, 1944　　　2 Sheets-Sheet 1

INVENTOR.
GEORGE HANIQUET
BY
Munn, Liddy & Glaccum
ATTORNEYS

Feb. 17, 1948. G. HANIQUET 2,436,107
POSITIVE FEED FOOD CHOPPER
Filed July 21, 1944 2 Sheets-Sheet 2
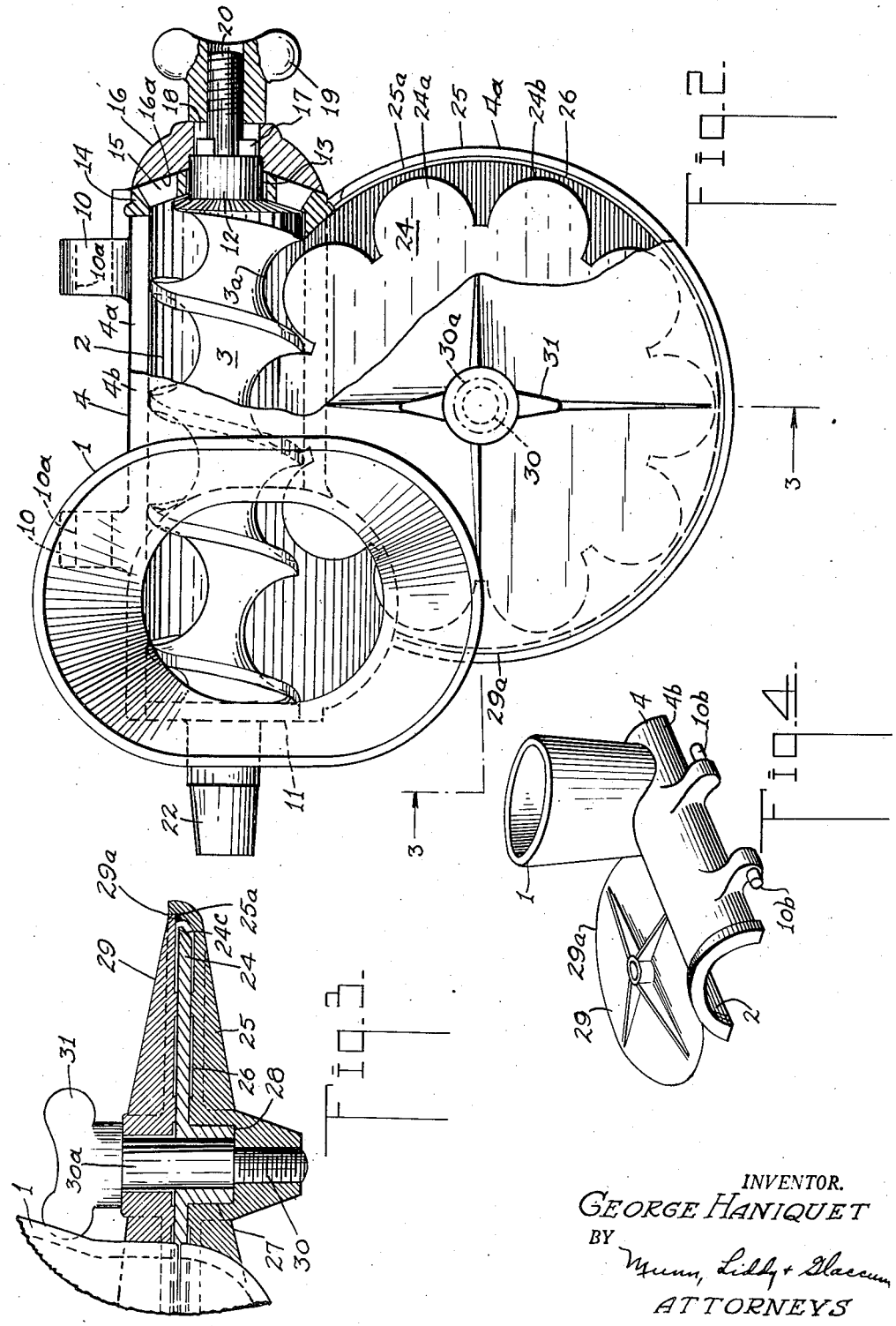
INVENTOR.
GEORGE HANIQUET
BY
*Munn, Liddy & Daccum*
ATTORNEYS Patented Feb. 17, 1948

2,436,107

UNITED STATES PATENT OFFICE 2,436,107

POSITIVE FEED FOOD CHOPPER

George Haniquet, Glendale, Calif.

Application July 21, 1944, Serial No. 545,916

1 Claim. (Cl. 146—182)

The present invention relates to improvements in a positive feed food chopper, and it consists of the combinations, constructions and arrangements hereinafter described and claimed.

An object of my invention is to provide a positive feed food chopper in which novel means is used for forcing the material from the hopper end of the device to the cutting end. I have found that the ordinary food chopper or grinder will not force leafy vegetables through the cutter end and therefore it cannot be used for this type of grinding. The screw becomes clogged with the leafy vegetable and the device must be dismantled to clean it. The novel means I use for positively moving the material to the cutting end is actuated by the spiral screw of the chopper. Any soft leafy vegetable can be ground without the device clogging.

A further object of my invention is to provide a device of the type described which is simple in construction and is durable and efficient for the purpose intended.

Other objects and advantages will appear in the following specification, and the novel features of the device will be particularly pointed out in the appended claim.

My invention is illustrated in the accompanying drawings forming a part of this application, in which:

Figure 2 is a top plan view of the device portions being broken away for clarity;

Figure 3 is a section taken substantially along the line 3—3 of Figure 2; and

Figure 4 is a perspective view of the upper food chopper section.

Figure 1:
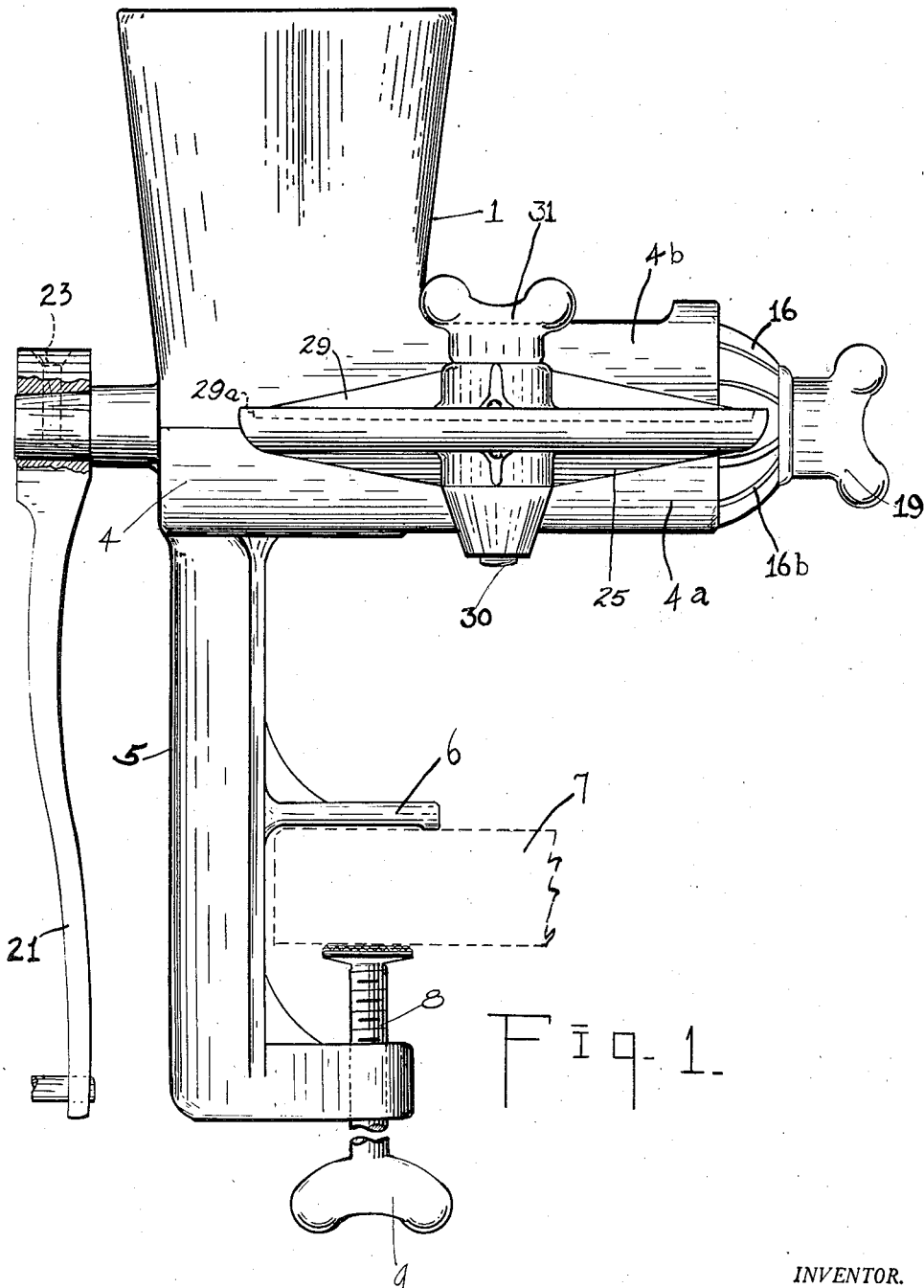
Figure 1 is a side elevation of the device showing my invention operatively applied thereto.

While I have shown only the preferred forms of my invention, it should be understood that various changes or modifications may be made within the scope of the appended claim without departing from the spirit and scope of the invention.

In carrying out my invention I provide a device comprising a hopper indicated at 1 and this hopper delivers material into a food-receiving channel 2, in which a screw 3 is rotatably mounted which in part is for advancing the material from the hopper to the cutting end of the device. The hopper is of ordinary construction.

A casing 4, see Figure 1, has the channel 2 and the casing is mounted on a support 5 that in turn has a plate 6 designed to rest upon a table 7 or other like supporting surface. A clamping screw 8 bears against the underside of the table and may be tightened in place by a winged portion 9 for clamping the device to the table in the customary manner. The casing 4 is divided horizontally into two parts, a lower part 4a that is integral with the member 5 and an upper part 4b that is integral with the hopper 1. Figure 2 shows the lower part 4a provided with hooks 10. The upper part 4b has trunnions 10b, see Figure 4, that are designed to be received in the semi-cylindrical recesses 10a provided in the hooks. The hooks 10 face downwardly and when assembling the upper part 4b to the hooks this part is inverted and moved until the trunnions 10b are received in the grooves 10a. The upper part is now swung about the axis of the two grooves as a pivot until the hopper 1 assumes an upright position and the upper part rests on the lower part. The upper part is locked in place by a means presently to be described.

The screw 3 has an end bearing 11 rotatably received in one end of the channel 2, see Figure 2. The other end of the screw has a cylindrical portion 12 that is received in the bore 13 of a stationary cutter 14. The cutter may be an integral part of the casing 4 or it may be removably secured in the casing. The cutter is held against rotation and has openings 15 through which the material is forced by the screw 3, and the pusher wheel 14.

A rotatable cutter 16 has a face 16a designed to bear against the outer face of the stationary cutter 14 and a rotation of the cutter 16 will sever the material passing through the openings 15 and cut it into small pieces. Figure 1 shows the rotating cutter 16 as having a plurality of radially extending cutting members 16b and these members move past the openings 15 during the operation of the device. The cutter 16 is operatively connected to the screw 3 by lugs 17 which are received in keyways 18. One or more lugs may be used and I have indicated two lugs in Figure 2. Any other means for connecting the rotating cutter with the screw 3 may be used. A wing nut 19 is threaded upon a shank 29 that is integral with the screw 3 and the wing nut clamps the rotatable cutter in place. A handle 21 is mounted on a reduced portion 22 of the screw 3 and is held in place by any suitable means such as a screw 23, see Figure 1.

I provide a positive material-moving means for the screw 3 and this means comprises a pusher wheel 24 that is disc-shaped as shown in Figure 2. The wheel may be of any size desired and has a periphery formed of semi-circular sections 24a that have their outer curved edges 24b designed to be received in the helical groove 3a of the screw 3. When the screw is rotated the pusher wheel 24 will likewise be rotated because the sections 24a will be received in the groove 3a and will be moved in much the same manner as a worm operates a worm wheel. The point to keep in mind is that the curved edges 24b are received snugly in the groove 3a so as to prevent food in the groove from riding around with the screw. At the same time there is no undue friction between the pusher edge 24b and the groove.

In Figure 3 I show how the pusher wheel 24 is rotatably secured in place, the lower casing part 4a has a disc-like portion 25 integral therewith and provided with a depression 26 of the same size and depth as the wheel 24. The wheel has a hub 27 and the hub is received in a bearing 28 formed in the lower disc portion 25. Figure 3 also shows the rims of the sections 24a bevelled at 24c so that they will have a cutting effect on the food rather than a crushing effect. The cutting effect is secondary to the main function of the sections which is to move the food along the helical groove of the screw 3.

The upper casing part 4b has an upper disc portion 29 that has its rim 29a received in a groove 25a, see Figures 2 and 3. A retaining screw 30 locks the two disc parts 25 and 29 together and has a cylindrical portion 30a around which the hub 27 rotates. A wing nut 31 is integral with the portion 30a and may be tightened for securing the disc parts together while still permitting a free rotation of the pusher wheel.

From the foregoing description of the various parts of the device, the operation thereof may be readily understood.

When the parts are assembled in the manner already described, food or other material may be placed in the hopper 1 and a rotation of the screw 3 will move the food to a position where it will be acted upon by the segments of the pusher wheel and moved forwardly through the channel 2. Figure 2 shows one of the segments 24a underlying the hopper 1 and entering the groove 3a to grip any food received therebetween and to aid in conveying it into the channel 2. If leafy vegetables are cut they will be forced along the channel because the pusher wheel sections 24a will act as stops or barriers to prevent the food from rotating with the screw and clogging it. Since the food is moved along the helical channel of the screw by the pusher wheel it will be forced through the openings 15 of the stationary cutter. The rotating cutter has its cutting fins or ribs 16b continuously passing the outer ends of the openings 15 and therefore the material issuing through the openings will be cut into small pieces. By means of the pusher wheel vegetables of all types may be cut into small pieces.

The device may be readily disassembled for cleaning and to accomplish this, the screw 30 is removed and then the upper casing part 4b is swung about the trunnions 11 until the hopper 1 is facing downwardly. At this point the trunnions 10b may be removed from the grooves 10a. If the stationary cutter is of the removable type the screw 3, the two cutters 14 and 16 and the wing nut 17 may be removed as a unit. This will free the channel 2 for cleaning and the cutters may be disassembled from the screw for cleaning.

If the stationary cutter 14 is an integral part of the lower casing 4a, the nut 19 may be removed and then the rotating cutter 16, after which the screw 3 may be removed from the opening 13 and the parts cleaned. It is obvious that the stationary cutter may be integral with the upper half 4b of the casing rather than with the lower half, if desired. Should the cutter 14 be entirely removable, it can be hardened and ground and this will make a higher grade food chopper or grinder.

The pusher wheel 24 may have as many segments 24a as desired and not necessarily the number illustrated. Each succeeding segment will take its turn in coming into proximity with the cutter end of the screw. The device will chop or grind the food received in the hopper and will discharge all of the food whether it is meat or soft leafy vegetables such as spinach leaves. The longitudinal movement of the food through the channel 2 does not depend solely on the rotation of the screw 3 but does depend on a positive means such as the pusher wheel disposed near the cutter head for forcing the food through the discharge openings 15.

The body of the casing could be made in one piece with a separate lid to cover the pusher wheel.

I claim:

A positive feed food chopper comprising a casing having a lower part with a half-cylindrical groove therein and a lower housing for a pusher wheel, an upper casing part having a half-cylindrical groove therein adapted to cooperate with the first-named half groove to form a cylindrical channel, said upper casing part having a hopper communicating with the second-named half cylindrical groove, a cover carried by the upper casing part and adapted to close the lower housing, a pusher wheel rotatably mounted between the lower housing and cover, a screw rotatably mounted in the channel and having a helical groove, said pusher wheel having convex segments in its periphery successively receivable in the groove as the screw is rotated, said segments causing any material in the groove to be advanced therealong, and material cutting means disposed at the end of the screw and actuated by the screw, said pusher wheel positively moving the material to the material cutting means to be acted thereupon, said lower casing parts having hooks constituting half-bearings, and said upper casing part having trunnions receivable in the hooks when the former is inverted, whereby the upper casing part can be swung into closed position after the trunnions are connected to the hooks, and a fastening screw for securing the cover to the lower housing part when the upper casing part is in closed position, said fastening screw also acting as the bearing for the pusher wheel.

GEORGE HANIQUET.

REFERENCES CITED

The following references are of record in the file of this patent:

UNITED STATES PATENTS

| Number | Name | Date |
|---|---|---|
| 234,478 | Hubner | Nov. 16, 1880 |
| 25,440 | Perry | Sept. 13, 1859 |
| 1,696,401 | Hiller | Dec. 25, 1928 |
| 527,921 | Ashby | Oct. 23, 1894 |
| 1,956,789 | Bressler | May 1, 1934 |

FOREIGN PATENTS

| Number | Country | Date |
|---|---|---|
| 799,094 | France | Mar. 23, 1936 |